(12) United States Patent
Han et al.

(10) Patent No.: US 7,697,236 B2
(45) Date of Patent: Apr. 13, 2010

(54) METHOD AND APPARATUS FOR DISK DAMPER EXTENDING ACROSS ALL DATA TRACKS OF A ROTATING DISK SURFACE UPWIND OF THE VOICE COIL ACTUATOR IN A HARD DISK DRIVE

(75) Inventors: Yun-Sik Han, Cupertino, CA (US); Young-Hoon Kim, Santa Clara, CA (US); Hae-Sung Kwon, San Jose, CA (US); Hyung Jai Lee, Cupertino, CA (US); Hong-Taek Lim, Suwon (KR)

(73) Assignee: Samsung Electronics Co., Ldt., Suwon, Kyungki-Doi (KR)

( * ) Notice: Subject to any disclaimer, the term of this patent is extended or adjusted under 35 U.S.C. 154(b) by 693 days.

(21) Appl. No.: 11/357,824

(22) Filed: Apr. 17, 2006

(65) Prior Publication Data
US 2006/0171064 A1 Aug. 3, 2006

Related U.S. Application Data

(63) Continuation-in-part of application No. 11/028,078, filed on Dec. 30, 2004, now abandoned, which is a continuation-in-part of application No. 10/142,078, filed on May 8, 2002, now Pat. No. 6,961,207, and a continuation-in-part of application No. 10/100,960, filed on Mar. 18, 2002, now Pat. No. 6,771,458.

(60) Provisional application No. 60/290,128, filed on May 10, 2001.

(51) Int. Cl.
G11B 33/14 (2006.01)

(52) U.S. Cl. .................................................. 360/97.02

(58) Field of Classification Search .... 360/97.01–97.03
See application file for complete search history.

(56) References Cited

U.S. PATENT DOCUMENTS

| 4,583,213 A | 4/1986 | Bracken et al. |
| 5,079,660 A | 1/1992 | Yumura et al. |
| 5,189,574 A | 2/1993 | Imamura et al. |

(Continued)

FOREIGN PATENT DOCUMENTS

JP 2000-322870 11/2000

(Continued)

*Primary Examiner*—A. J. Heinz
(74) *Attorney, Agent, or Firm*—GSS Law Group

(57) ABSTRACT

The invention includes a disk damper containing an extended area located on the upstream side of the head stack assembly. The extended area is joined to a tail section. In the extended area, the disk damper provides a wall near the neighboring rotating disk surface that extends from the outside diameter to the inside diameter of the rotating disk surface. Experimental results have shown that this provides much more consistent dampening of disk vibrations and vibrations of a head stack assembly positioned anywhere from the inside diameter to the outside diameter. The hard disk drive including the disk damper. Using the disk damper in a hard disk drive to improve the reliability of the hard disk drive during track following. Making the hard disk drive using the disk damper, and the hard disk drive as a product of that manufacturing process.

16 Claims, 6 Drawing Sheets

U.S. PATENT DOCUMENTS

| | | |
|---|---|---|
| 5,417,743 A | 5/1995 | Dauber |
| 5,483,397 A | 1/1996 | Gifford et al. |
| 5,625,512 A | 4/1997 | Smith |
| 5,854,725 A | 12/1998 | Lee |
| 5,898,545 A | 4/1999 | Schirle |
| 5,910,862 A | 6/1999 | Ogawa et al. |
| 6,014,287 A | 1/2000 | Ehlers et al. |
| 6,097,568 A | 8/2000 | Ekhoff |
| 6,236,532 B1 | 5/2001 | Yanagisawa |
| 6,239,943 B1 | 5/2001 | Jennings et al. |
| 6,360,843 B1 | 3/2002 | Kim et al. |
| 6,407,879 B1 | 6/2002 | Fruge et al. |
| 6,529,345 B1 | 3/2003 | Butler et al. |
| 6,717,768 B2 | 4/2004 | Kim |
| 6,809,898 B1 | 10/2004 | Prochazka |
| 7,031,105 B2 | 4/2006 | Kim et al. |
| 7,119,986 B2 * | 10/2006 | Alt et al. .................. 360/97.02 |
| 7,310,199 B2 * | 12/2007 | Pottebaum et al. ....... 360/97.02 |
| 7,327,530 B2 * | 2/2008 | Lee et al. ................. 360/97.02 |
| 2002/0135933 A1 | 9/2002 | Harrison et al. |
| 2003/0076621 A1 | 4/2003 | Kim |
| 2003/0099060 A1 | 5/2003 | Kang et al. |
| 2003/0117746 A1 | 6/2003 | Kovinskaya et al. |
| 2003/0147175 A1 | 8/2003 | Tadepalli et al. |

FOREIGN PATENT DOCUMENTS

| | | |
|---|---|---|
| JP | 2000-322871 | 11/2000 |
| JP | 2000-331460 | 11/2000 |

* cited by examiner

METHOD AND APPARATUS FOR DISK DAMPER EXTENDING ACROSS ALL DATA TRACKS OF A ROTATING DISK SURFACE UPWIND OF THE VOICE COIL ACTUATOR IN A HARD DISK DRIVE

CROSS REFERENCE TO PRIOR APPLICATIONS:

This application is a continuation-in-part of application Ser. No. 11/028,078, filed Dec. 30, 2004, now abandoned which is a continuation-in-part of application Ser. No. 10/142,078, filed May 8, 2002, now U.S. Pat. No. 6,961,207 and of application Ser. No. 10/100,960, filed Mar. 18, 2002, now U.S. Pat. No. 6,771,458 which claimed the benefit of U.S. Provisional Application No. 60/290,128, filed May 10, 2001, all of which are incorporated by reference.

TECHNICAL FIELD

The invention relates to the control of Track Mis-Registration (TMR) in a hard disk drive, in particular, to control of TMR through the use and structure of a disk damper to the control of air turbulence around a head stack assembly and the control of vibration of the disks in the hard disk drive.

BACKGROUND OF THE INVENTION

Hard disk drives include at least one read-write head embedded in a slider and positioned near a rotating disk surface to access data organized as tracks on a rotating disk surface. Typically, the tracks are concentrically arranged on the rotating disk surface. The read-write head is positioned near the track by a voice coil actuator, which moves the slider through an actuator arm. The voice coil actuator includes a voice coil, which is stimulated by a time varying electrical signal from a servo controller. The time varying signal causes the voice coil to interact with fixed magnets, and pivot the actuator assembly it is coupled with, moving the actuator arm, and positioning the read-write head.

Often a hard disk drive has multiple read-write heads, accessing multiple rotating disk surfaces. Often a hard disk drive may include more than one disk. Each disk can support up to two disk surfaces for data storage.

There are typically two separate operations required to position the read-write head to access a track. First, a track seek operation is performed. This brings the read-write head close to the track. Then a track following operation is performed while the read-write head actively accesses the data. While following the track, a Position Error Signal (PES) is actively sensed by the interface circuitry coupled with the read channel of the read-write head. The PES is a distance measure derived from an encoded pattern laid down on the disk surface before the track data is actually written. The following of the track uses the PES signal to estimate distance from the written track, and adjust the voice coil stimulus, and possibly also control a micro-actuator coupled to the slider, to refine the positioning of the read-write head and optimize the reliability of the access operation being performed. TMR is usually measured as the acceptable amount of positional error for the read-write head on the servo track pattern.

The manufacturers of hard disk drives are constantly challenged to increase track density, to put more information onto each rotating disk surface of the hard disk drive. This has made the acceptable level of PES smaller and smaller. Recently, the TMR has become less than 10 nano-meters (nm).

Vibration of the disks and vibration of the head stack assembly containing the sliders are often considered today to be the most significant contributors to the PES errors of the track following operation. And airflow near the head stack assembly, particularly turbulent airflow, significantly contributes to vibration of the head stack assembly.

In the last few years, the use of disk dampers has become common. These devices narrow the gap between the rotating disk surfaces and the nearest stationary walls, affecting the air flowing in the gap to minimize the airflow turbulence near the head stack assembly. There are however problems with existing devices. The existing devices do not provide consistent dampening of air flow turbulence, in particular, there is a tendency for increased turbulence when the head stack assembly is near the inside diameter of the rotating disk surfaces. What is needed is a disk damper which consistently dampens air turbulence for a head stack assembly when position anywhere from the inside diameter to the outside diameter.

SUMMARY OF THE INVENTION

The invention includes a disk damper containing an extended area located on the upstream side of the head stack assembly and joined to a tail section. In the extended area, the disk damper provides a wall near the neighboring rotating disk surface near every data track, extending from the outside diameter to the inside diameter of the rotating disk surface. Experimental results have shown that this provides much more consistent dampening of disk vibrations and vibrations of the head stack assembly positioned anywhere from the inside diameter to the outside diameter.

The invention includes a hard disk drive including the disk damper providing a wall of the extended area near all the data tracks of the neighboring rotating disk surface. The invention includes using the disk damper in a hard disk drive to improve the reliability of the hard disk drive during track following. The invention also includes making the hard disk drive using the disk damper, and the hard disk drive as a product of that manufacturing process.

DETAILED DESCRIPTION

The invention relates to the control of Track Mis-Registration (TMR) in a hard disk drive, in particular, to control of TMR through the use and structure of a disk damper to control air turbulence around a head stack assembly and control vibration of the disks in the hard disk drive.

The invention includes a disk damper containing an extended area located on the upstream side of the head stack assembly joined to a tail section. In the extended area, the disk damper provides a wall near the neighboring rotating disk surfaces that extends from the outside diameter to the inside diameter of the rotating disk surfaces. Experimental results have shown that this provides much more consistent dampening of disk vibrations and vibrations of a head stack assembly positioned anywhere from the inside diameter to the outside diameter.

Figure 1:
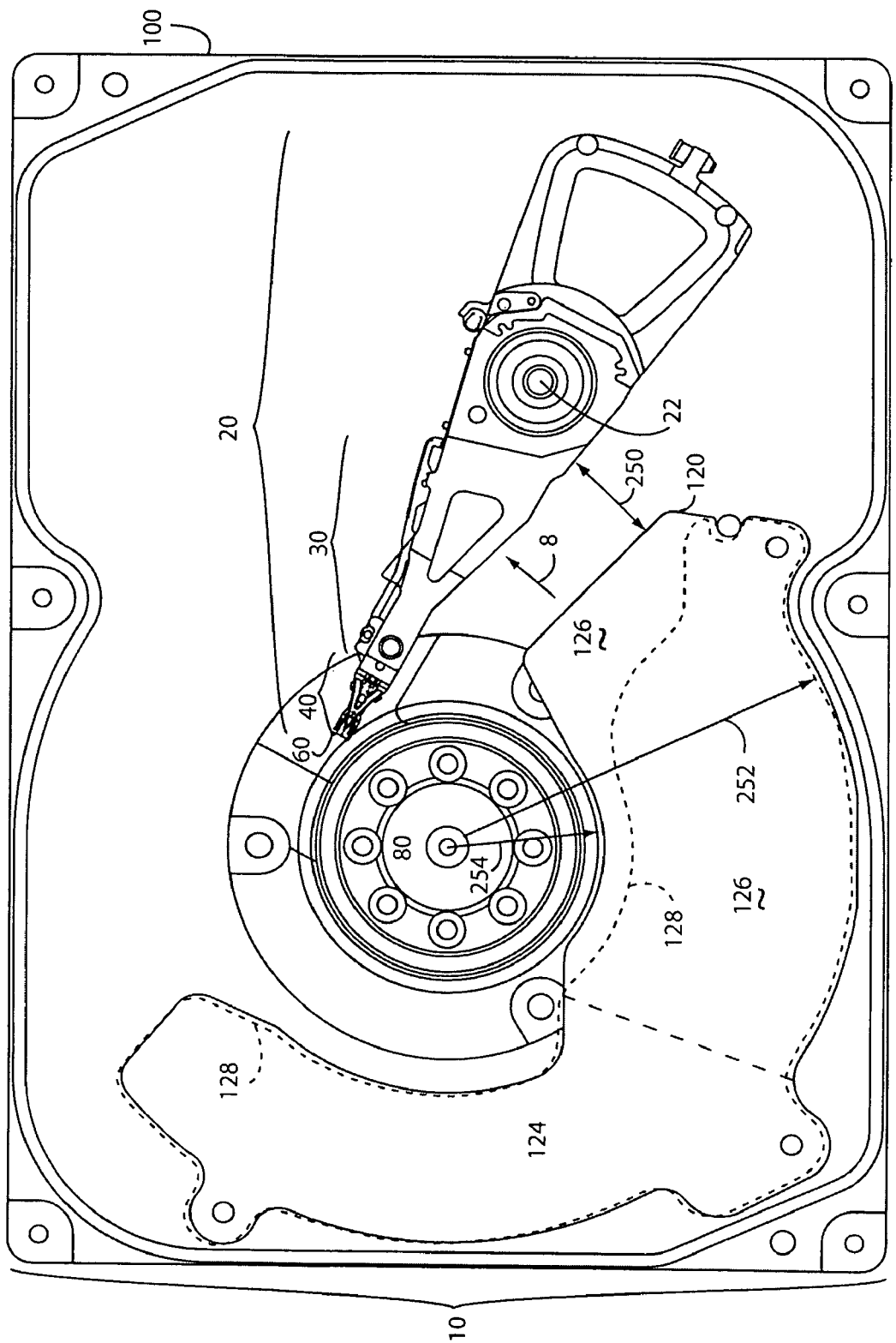
FIG. 1 shows a top view of a partially assembled hard disk drive comparing the invention's disk damper of FIG. 2A with a prior art disk damper of FIG. 2B.
Figure 2A:
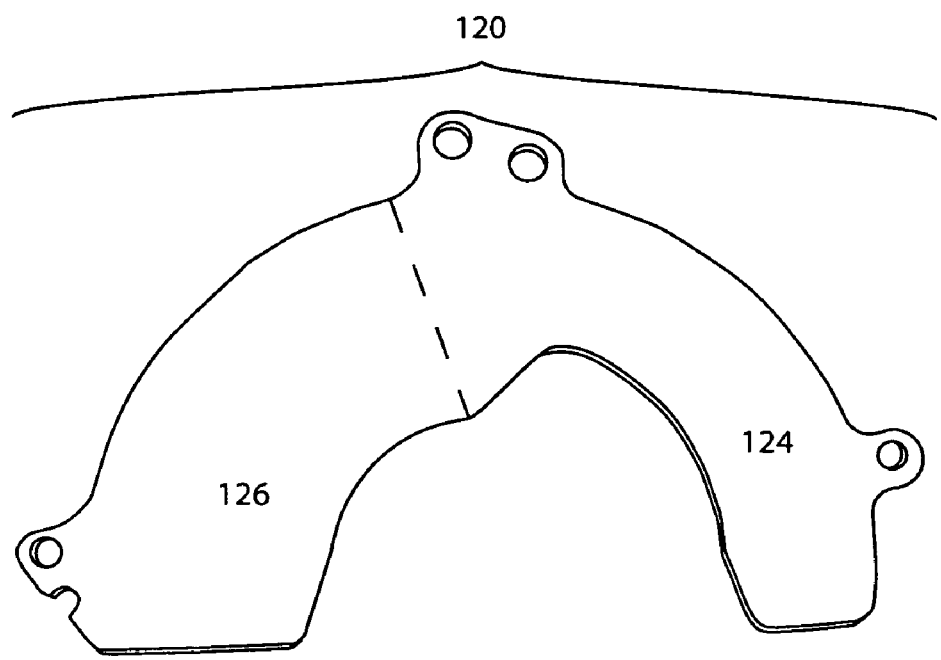
Figure 2B:
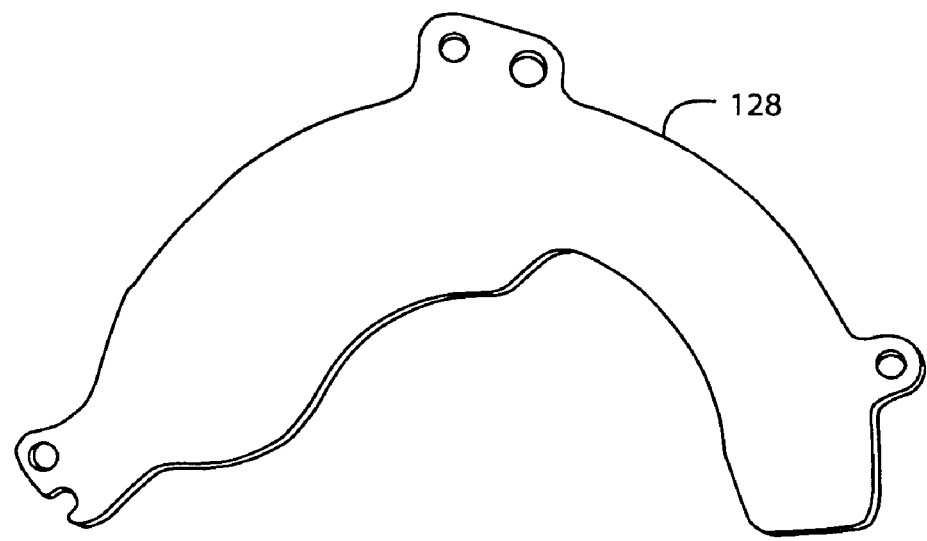

The disk damper 120 shown in FIGS. 1 and 2A differs from the prior art disk damper 128 of FIGS. 1 and 2B by having an extended area 126 joined to a tail section 124. The tail section is similar to the prior art disk damper. The extended area provides a first wall 130 near all the data tracks of a first rotating disk surface 220 and a second wall 132 near all the data tracks of a second rotating disk surface 220-2 as shown in FIGS. 3A and 3B when included in a hard disk drive 10.

Figure 3A:
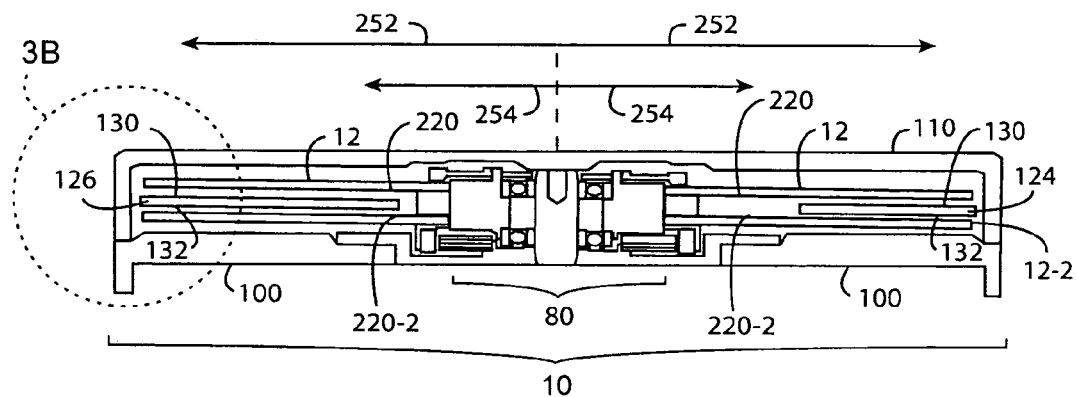
FIG. 3A shows a cross section of the hard disk drive including the inventions disk damper showing the extended area and the tail section near neighboring rotating disk surfaces.
Figure 3B:
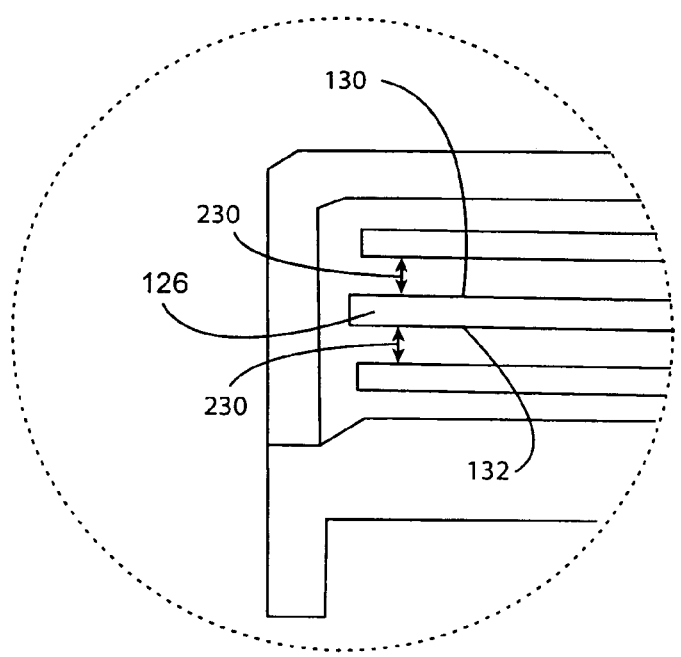
FIG. 3B shows the gap between the walls and their neighboring rotating disk surfaces of FIG. 3A.
Figure 4:
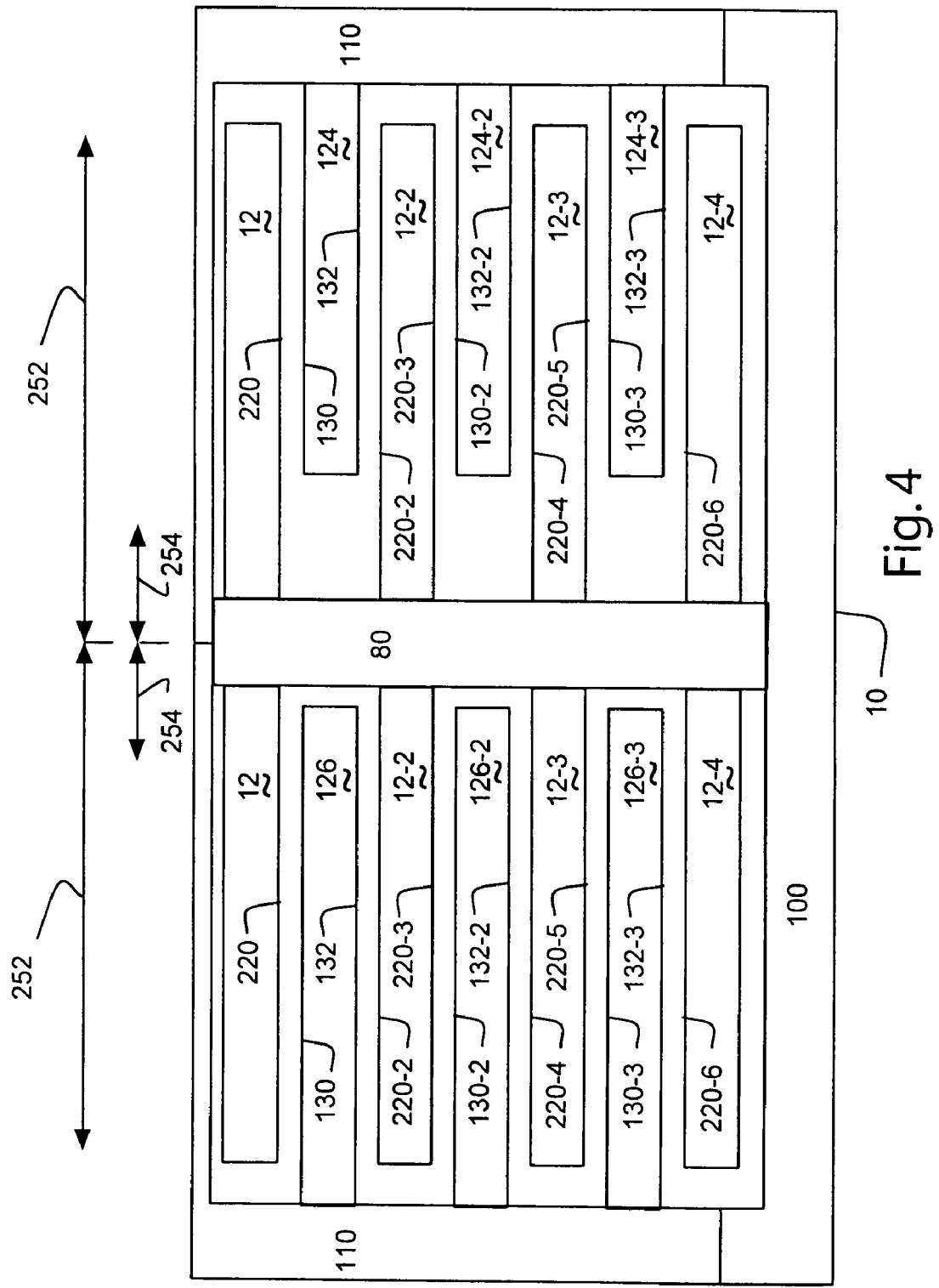
FIG. 4 shows a cross section of a hard disk drive using more than one of the invention's disk dampers.

The extended area 126 preferably provides the first wall 130 from an inside diameter 254 to an outside diameter 252 of the first rotating disk surface 220 and provides the second wall 132 from the inside diameter to the outside diameter of the second rotating disk surface 220-2 as shown in FIGS. 3A and 4. The tail section 124 preferably provides the first wall near the data tracks toward the outside diameter of the first rotating disk surface and provides the second wall near the data tracks toward the outside diameter of the second rotating disk surface.

In certain embodiments, the outside diameter 252 of FIGS. 1, 3A, and 4 may be at most 50 millimeters (mm). The inside diameter 254 may be at most 20 mm. The outside diameter may further be at least 47 mm. The inside diameter may further be at least 18 mm. The distance D 250 may be at least 5 mm and at most 21 mm. The distance D may further be between 6 mm and 10 mm. Preferably, the distance D is between 7 mm and 9 mm. Further, the extended area 126 is at least 35 degrees of the arc of the disk, known herein as the extended area angle. The extended area angle is preferably at least 45 degrees. The extended area angle may further be at most 140 degrees and preferably at most 120 degrees. The tail section is at most 210 degrees minus the angle of the extended area, and preferably at most 180 degrees minus the angle of the extended area.

The gap 230 or distance from a wall of the disk damper to the neighboring rotating disk surface is preferably at most 1 mm. The gap may further be at least 0.3 mm, and preferably at least 0.4 mm. As shown in FIG. 3B, the gap between the first wall 130 and the first rotating disk surface 220 is preferably very nearly equal to the gap between the second wall 130-2 and the second rotating disk surface 220-2.

The hard disk drive 10 may include more than one disk damper as shown in FIG. 4. Each disk damper 120 includes an extended area 126 joined to a tail section 124. The extended area provides walls near all the data tracks of the neighboring rotating disk surfaces, preferably from the outside diameter to the inside diameter. The tail section provides the walls near the data tracks toward an outside diameter of the neighboring rotating disk surfaces.

More specifically, the second disk damper 120-2 includes a second extended area 126-2 joined to a second tail section 124-2. The second extended area provides the first wall second instance 130-2 from the inside diameter 254 to the outside diameter 252 of the third rotating disk surface 220-3 and provides the second wall second instance 132-2 from the inside diameter to the outside diameter of the fourth rotating disk surface 220-4. The second tail section provides the first wall second instance near the data tracks toward the outside diameter of the third rotating disk surface and provides the second wall second instance near the data tracks toward the outside diameter of the fourth rotating disk surface.

Similarly, the third disk damper 120-3 includes a third extended area 126-3 joined to a third tail section 124-3. The third extended area provides the first wall third instance 130-3 from the inside diameter 254 to the outside diameter 252 of the fifth rotating disk surface 220-5 and provides the second wall sixth instance 132-6 from the inside diameter to the outside diameter of the sixth rotating disk surface 220-6. The third tail section provides the first wall third instance near the data tracks toward the outside diameter of the fifth rotating disk surface and provides the second wall third instance near the data tracks toward the outside diameter of the sixth rotating disk surface.

The invention includes the hard disk drive 10 containing the disk damper 120. The disk damper provides walls of the extended area 126 near all the data tracks of the neighboring rotating disk surfaces. The hard disk drive preferably includes at least two disks, the first disk 12 and the second disk 12-2. The first disk includes the first rotating disk surface 220. The second disk includes the second rotating disk surface 220-2. These two rotating disk surfaces are near the walls of the disk damper as shown in FIGS. 3A to 4.

The hard disk drive 10 may further include a third disk 12-3 and a second disk damper 120-2 as in FIG. 4. The second disk 12-2 may include a third rotating disk surface 220-3 and the third disk may include a fourth rotating disk surface 220-4, both near the walls of the second disk damper.

Similarly, the hard disk drive 10 may further include a fourth disk 12-4 and a third disk damper 120-3. The third disk 12-3 may include a fifth rotating disk surface 220-5 and the fourth disk may include a sixth rotating disk surface 220-6, both near the walls of the third disk damper.

The invention includes making the hard disk drive using the disk damper, and the hard disk drive as a product of that manufacturing process. Looking at the manufacture of the hard disk drive 10 of FIGS. 1, 3, and 4. The manufacturing includes the following steps: the disk damper 120 is mounted to the disk base 100 and between the first rotating disk surface 220 and the second rotating disk surface 220-2. The voice coil actuator 20 is mounted through the actuator pivot 22 within the distance D 250 downwind 8 from the disk damper.

The first disk 12 and the second disk 12-2 are mounted on the spindle motor 80 shown in FIGS. 1, 3A, and 4. The spindle motor turns about its spindle, rotating the disks, to create the rotating disk surfaces during normal operation of the hard disk drive 10.

The disk cover 110 is later attached to the disk base 100. The voice coil actuator 20 is electrically coupled with a printed circuit board (not shown) to electrically interact with the read-write head and control the voice coil actuator in positioning the read-write head embedded in the slider 60 through the actuator arm 30 over a track of the neighboring rotating disk surface 220.

The read-write head is positioned near the track by the voice coil actuator 20, which moves the slider 60 through an actuator arm 30, as shown in FIG. 1. The voice coil actuator includes a voice coil, which is stimulated by a time varying electrical signal from a servo controller. The time varying signal causes the voice coil to interact with fixed magnets, and pivot the actuator assembly it is coupled with, moving the actuator arm, and positioning the read-write head.

The invention includes using the disk damper 120 in a hard disk drive 10 to improve the reliability of the hard disk drive during track following. FIGS. 5 to 8 explore the results of experiments using the invention's disk damper in a hard disk drive, compared to a similar hard disk drive equipped with the prior art disk damper 128. Both hard disk drives had the same Tracks Per Inch (TPI) of over 100,000 TPI. PES is measures in units of a count, which is the track pitch divided by 512. The track pitch is 1 inch/TPI.

Figure 5:
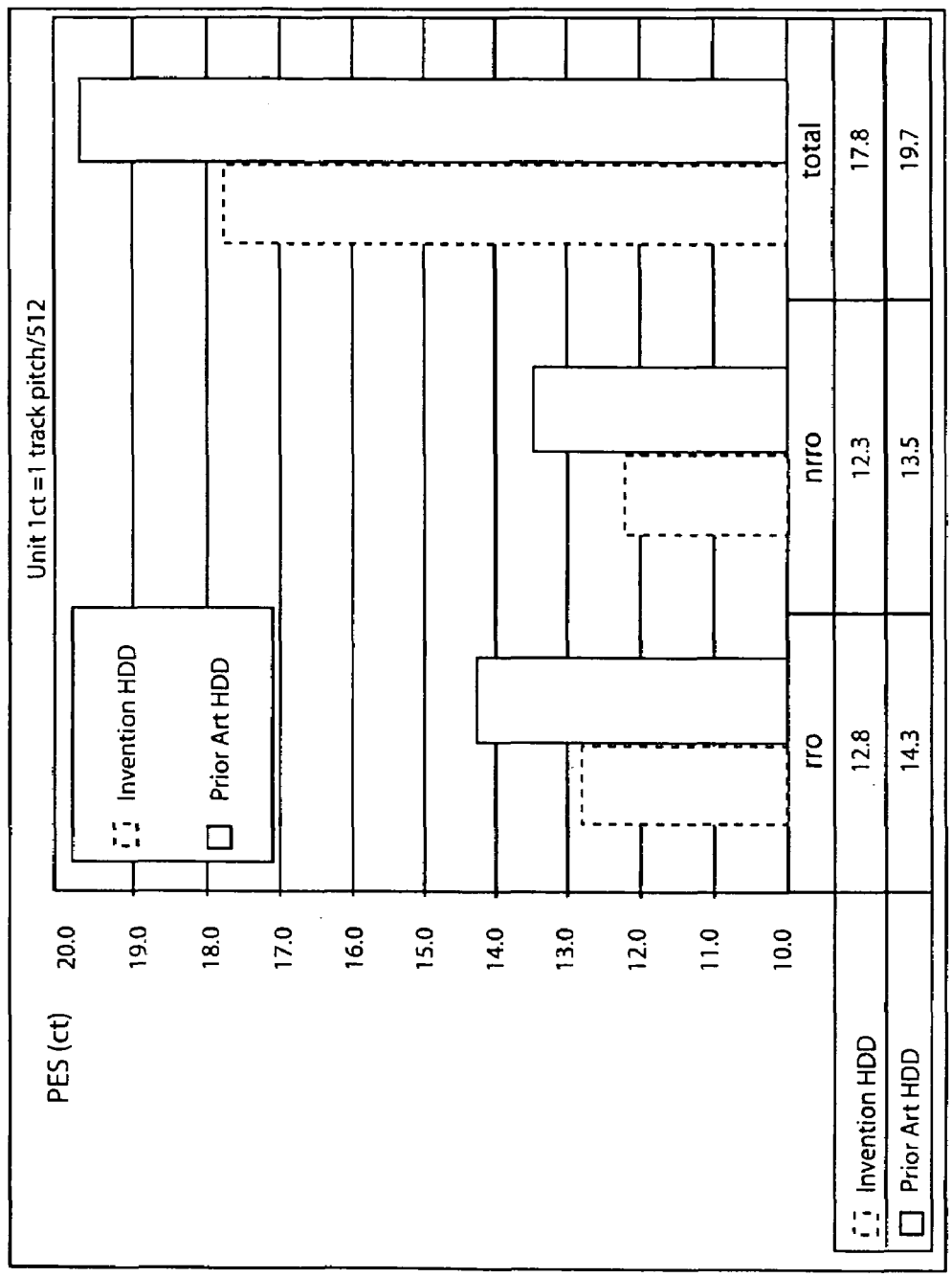
FIGS. 5 and 6 show some experimental results relating to the invention.

FIG. 5 shows the cumulative PES for these two hard disk drives. The Repeatable Run Out (RRO) is the repeatable PES component. Whereas the Non Repeatable Run Out (NRRO) is the non repeatable PES Component. The RRO and NRRO are the two legs of a right triangle, with the Total being the hypotenuse. So Total$^2$=RRO$^2$+NRRO$^2$. The hard disk drive 10 using the invention's disk damper 120 has an RRO of 12.8 counts, an NRRO of 12.3 counts, for a Total PES of 17.8 counts. The hard disk drive using the prior art disk damper 128 has an RRO of 14.3 counts, an NRRO of 13.5 counts, for a Total PES of 19.7 counts. In each component as well as the total PES, the hard disk drive with the invention's disk damper was more accurate during track following operations.

Figure 6:
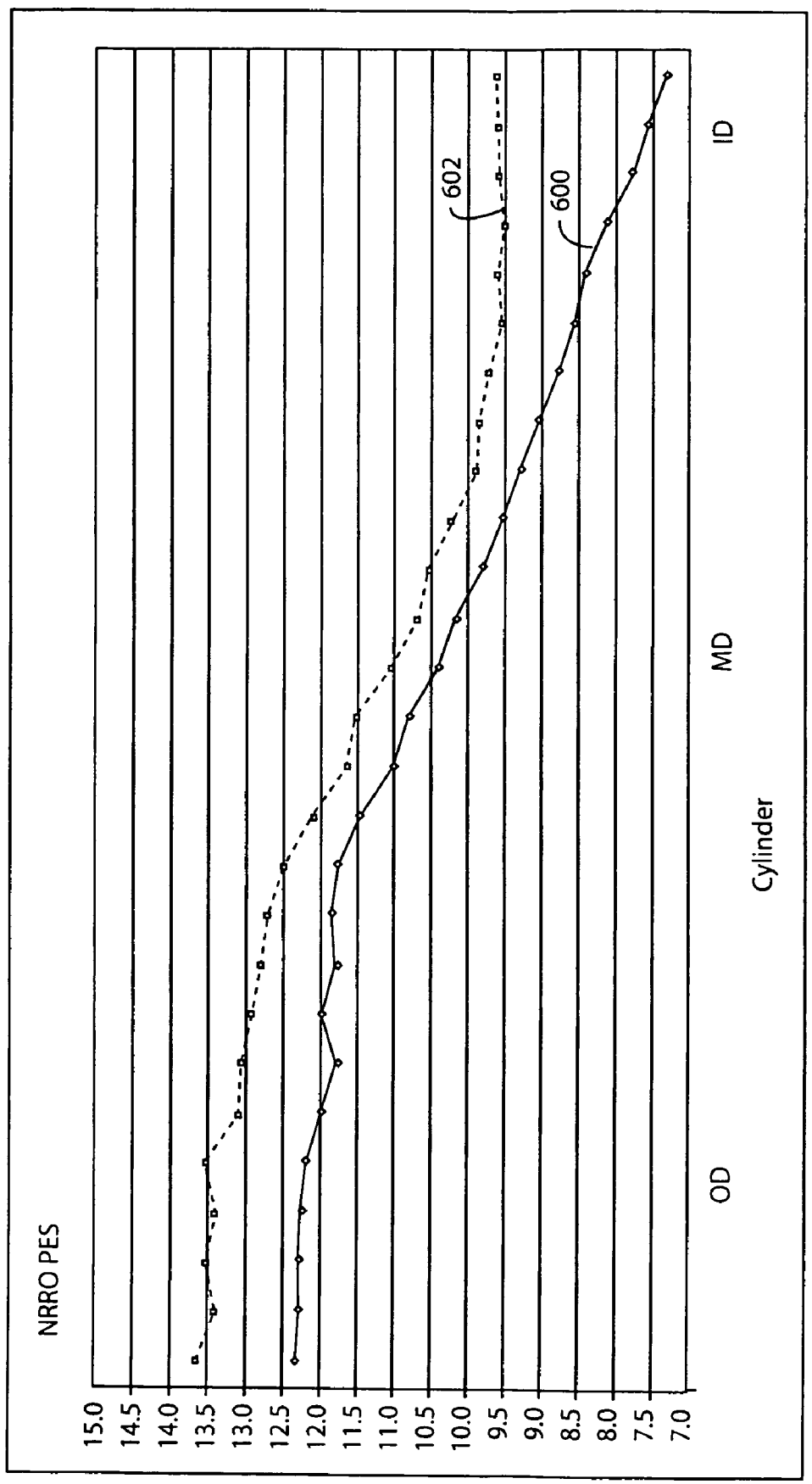

FIG. 6 shows a more detailed look at the NRRO PES component for specific tests performed from the Outside Diameter 252, which is labeled OD in the Figure, through the Mid Diameter, labeled MD, to the Inside Diameter 254, labeled ID. Trace 600 shows the NRRO PES for the hard disk drive 10 using the inventions disk damper 120. Trace 602 shows the NRRO PES for the hard disk drive using the prior art disk damper 128. The left axis shows the NRRO in terms of counts. The horizontal axis shows the location of tracks, with a track at the outside diameter 252 having location 0 and a track at the inside diameter being located toward the extreme right hand side of the Figure.

At the outside diameter 252, labeled OD, the hard disk drive 10 with the invention's disk damper 120 gives an NRRO reduction between 0.8 to 1.2 counts over the hard disk drive with the prior art disk damper. At the Mid Diameter, labeled MD, the hard disk drive 10 gives an NRRO reduction between 0.7 and 1 count over the prior art hard disk drive. At the Inside Diameter 254, labeled ID, the hard disk drive 10 gives a 2 to 2.2 count reduction over the prior art hard disk drive. This shows consistently better track following for the hard disk drive 10, particularly for tracks near the inside diameter.

In the experiments performed with the test hard disk drives, at the outside diameter 252 (OD), the hard disk drive 10 including the invention's disk damper 120 had an NRRO PES of 11.3 counts, whereas the hard disk drive with the prior art disk damper 128 had an NRRO PES of 12.0 counts. At the inside diameter 254 (ID), the hard disk drive 10 including the invention's disk damper 120 had an NRRO PES of 7.3 counts, whereas the hard disk drive with the prior art disk damper 128 had an NRRO PES of 9.8 counts. The NRRO PES spectrum indicates a reduction of the disk resonance peaks in the NRRO spectrum in the 700 to 1500 Hz frequency range as well as the reduction of the flow-induced disturbance of the head stack assembly 40 under 600 Hz frequency, in comparison with the prior art disk damper 128 shown in FIG. 2B. Airflow simulations indicate that the vibration level is suppressed by 3% for the first disk 12 and the second disk 14. Airflow simulations also indicate that the level of vibration at the slider 60 in the actuator arm 30 is also mitigated noticeably compared to the prior art disk dampers.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A disk damper, comprising:
    an extended area (126) for providing a first wall (130) near all data tracks of a first rotating disk surface (220) and providing a second wall (132) near all data tracks of a second rotating disk surface (220-2), with said extended area configured to be located on an upstream side of a voice coil actuator (20) extending from an inside diameter (254) to an outside diameter (252) of said first rotating disk surface, to within a distance D (250) of said voice coil actuator;
    said extended area joined to a tail section (124) for providing said wall near said data tracks toward said outside diameter of said first rotating disk surface and providing said second wall near said data tracks toward said outside diameter of said second rotating disk surface, to within said distance D of said voice coil actuator;
    wherein said disk damper is configured to mount to a disk base in a hard disk drive at a distance D upwind from said voice coil actuator; and
    wherein said distance D is greater than or equal to (at least) 5 mm and is less than or equal to (at most) 21 mm.

2. The disk damper of claim 1, wherein said extended area provides said second wall from said inside diameter to said outside diameter of said second rotating disk surface.

3. The disk damper of claim 2, wherein said outside diameter is less than or equal to (at most) 50 mm; and wherein said inside diameter is at most 20 mm.

4. The disk damper of claim 3, wherein said outside diameter is greater than or equal to (at least) 47 mm; and wherein said inside diameter is at least 18 mm.

5. The disk damper of claim 1, wherein said distance D is at least 6 mm and at most 10 mm.

6. The disk damper of claim 5, wherein said distance D is at least 7 mm and at most 9 mm.

7. A hard disk drive, comprising:
    a disk base;
    a spindle motor mounted on said disk base and coupled to a first disk (12) and a second disk (12-2) to create a first rotating disk surface (220) on said first disk near a second rotating disk surface (220-2) on said second disk;
    a voice coil actuator (20) pivotably mounted on said disk base, configured to position sliders to access all data tracks on said first rotating disk surface and said second rotating disk surface; and
    a disk damper mounted to said disk base at a distance D (250) upwind from said voice coil actuator, comprising an extended area (126) including a first wall (130) near said all data tracks of said first rotating disk surface and a second wall (132) near said all data tracks of said second rotating disk surface, to within said distance D of said voice coil actuator,
    with said extended area joined to a tail section continuing said walls near said data tracks from an inside diameter (254) toward an outside diameter (252) of said first rotating disk surface and said second rotating disk surface;
    wherein said distance D is greater than or equal to (at least) 5 mm and is less than or equal to (at most) 21 mm.

8. The hard disk drive of claim 7, wherein said outside diameter is greater than or equal to (at least) 47 mm; and wherein said inside diameter is at least 18 mm.

9. The hard disk drive of claim 7, further comprising:
    said disk damper separated from said first rotating disk surface by a gap (230); and
    said disk damper separated from said second rotating disk surface by said gap;
    and wherein said gap is less than or equal to (at most) 1 mm.

10. The hard disk drive of claim 9, wherein said gap is at most 0.3 mm.

11. The hard disk drive of claim 7, further comprising: a second of said disk dampers between said second disk including a third rotating disk surface and a third disk including a fourth rotating disk surface.

12. The method of making said hard disk drive of claim 7, comprising the steps of:
   mounting said disk damper to said disk base and between said first rotating disk surface and said second rotating disk surface; and
   mounting said voice coil actuator through said actuator pivot within said distance D downwind from said disk damper.

13. The hard disk drive as a product of the process of claim 12.

14. The hard disk drive of claim 7, wherein said outside diameter is less than or equal to (at most) 50 mm; and wherein said inside diameter is at most 20 mm.

15. The hard disk drive of claim 7, wherein said distance D is at least 6 mm and at most 10 mm.

16. The hard disk drive of claim 15, wherein said distance D is at least 7 mm and at most 9 mm.

\* \* \* \* \*